(12) United States Patent
Ponthanplavil Razallian et al.

(10) Patent No.: US 11,538,356 B2
(45) Date of Patent: Dec. 27, 2022

(54) ADAPTABLE PRESENTATION FOR NETWORK-CONNECTED ELECTRONIC DEVICES

(71) Applicant: Samsung Electronics Company, Ltd., Suwon-si (KR)

(72) Inventors: Sojan Ponthanplavil Razallian, Sunnyvale, CA (US); Shankar Narayan Venkatesan, Santa Clara, CA (US); Akshat Sehgal, Sunnyvale, CA (US); Artem Boykov, San Jose, CA (US)

(73) Assignee: Samsung Electronics Co., Ltd.

( * ) Notice: Subject to any disclaimer, the term of this patent is extended or adjusted under 35 U.S.C. 154(b) by 334 days.

(21) Appl. No.: 16/899,304

(22) Filed: Jun. 11, 2020

(65) Prior Publication Data

US 2021/0150931 A1     May 20, 2021

Related U.S. Application Data

(60) Provisional application No. 62/936,113, filed on Nov. 15, 2019.

(51) Int. Cl.
    *G09B 19/00*         (2006.01)
    *H04L 67/306*       (2022.01)
    *G06Q 10/02*        (2012.01)

(52) U.S. Cl.
    CPC ............. *G09B 19/00* (2013.01); *G06Q 10/02* (2013.01); *H04L 67/306* (2013.01)

(58) Field of Classification Search
    CPC ........ G09B 19/00; G06Q 10/02; G06Q 50/10; G06Q 10/00; H04L 67/2869; H04L 67/30; H04L 67/303; H04L 67/306
    See application file for complete search history.

(56) References Cited

U.S. PATENT DOCUMENTS 8,996,452 B2    3/2015   Danciu
9,684,634 B2    6/2017   Dong
(Continued)

FOREIGN PATENT DOCUMENTS

AU     2006200047 B2 *   2/2011  ............. G06F 16/30
CA          2516859 C *   9/2008  ......... H04L 41/0806
(Continued)

OTHER PUBLICATIONS

Ponzanelli et al. "Automatic Identification and Classification of Software Development Video Tutorial Fragments", May 1, 2019, IEEE Transactions on Software Engineering (vol. 45, Issue: 5, pp. 464-488) (Year: 2019).*

(Continued)

*Primary Examiner* — Davoud A Zand (57) ABSTRACT

A method includes determining user content to be provided in a number of formats to a number of network-connected devices associated with a user. The number of network-connected devices are of a plurality of device types. The method further includes determining a fulfillment goal based at least in part on the user content, and generating a multi-fragment application package based at least in part on the respective device types of the number of network-connected devices. The multi-fragment data package includes an adaptable presentation layer that includes instructions for presenting respective fragments of the multi-fragment application package on the number of network-connected devices in accordance with the fulfillment goal. The method further includes providing the respective fragments of the multi-fragment application package to the number of network-connected devices.

20 Claims, 7 Drawing Sheets

(56) References Cited

U.S. PATENT DOCUMENTS

| | | |
|---|---|---|
| 10,149,335 B2 | 12/2018 | Gujral |
| 10,282,475 B2 | 5/2019 | Patten |
| 2010/0053069 A1 | 3/2010 | Tricoukes |
| 2012/0054095 A1* | 3/2012 | Lesandro ............... G06F 9/452 |
| | | 705/39 |
| 2016/0095060 A1 | 3/2016 | Seddighrad |
| 2019/0082224 A1 | 3/2019 | Bradley |
| 2019/0268661 A1 | 8/2019 | Park |

FOREIGN PATENT DOCUMENTS

| | | |
|---|---|---|
| CN | 102497630 A | 6/2012 |
| CN | 108337279 A | 7/2018 |
| CN | 109151805 A | 1/2019 |
| KR | 101696818 B1 | 1/2017 |
| KR | 10-2018-0016175 A | 2/2018 |
| KR | 10-20190102432 A | 9/2019 |
| KR | 20190101585 A | 9/2019 |

OTHER PUBLICATIONS

International Search Report and Written Opinion for International Application No. PCT/KR2020/010205, dated Nov. 11, 2020.
Ikram Ud Din et al., 'Trust Management Techniques for the Internet of Things: A Survey' IEEE Access (vol. 7) pp. 29763-29787, pp. 29763-29779, Nov. 12, 2018.
Bansal, Himanshu, et al."Exploring Design for multi-device, Multi-environment and Multimodal Connected Experiences," Conference Paper Jul. 2016, DOI: 10.1007/978-3-319-39862-4_2, © Springer-Verlag Berlin Heidelberg 2011, https://www.researchgate.net/publication/304188501, uploaded on Mar. 2, 2018, 13 pgs.

* cited by examiner

ADAPTABLE PRESENTATION FOR NETWORK-CONNECTED ELECTRONIC DEVICES

PRIORITY

This application claims the benefit under 35 U.S.C. § 119(e) of U.S. Provisional Patent Application No. 62/936,113, filed 15 Nov. 2019, which is incorporated herein by reference.

TECHNICAL FIELD

This disclosure relates generally to network-connected electronic devices, and, more particularly, to an adaptable presentation for network-connected electronic devices.

BACKGROUND

The IoT (Internet of Things) typically denotes a collection of devices that may each be connected to the internet, and, by extension, connected to each other for the purposes of sharing data between each of the collection of IoT devices. Indeed, as many different types of IoT devices continue to be deployed and integrated into various systems, challenges surrounding the synchronous presentation and display of information across the collection of IoT devices have become more pronounced. Particularly, the presentation and display of information may be highly dynamic in IoT applications, as the presentation and display of the same information across the collection of devices may markedly vary with, for example, the device platform, device form factors, device capability, and device compatibility. Such inconsistencies with respect to the presentation and display of information across the collection of IoT devices may lead to undesirable losses of certain presentable content, as well as to the diminishment of the overall experience of the user.

DESCRIPTION OF EXAMPLE EMBODIMENTS

The present embodiments are directed toward generating an adaptable and fragmented presentation layer to be provided to an ecosystem of different network-connected devices for contextual presentation of user content in various formats (e.g., visual presentation, voice presentation, audible presentation, haptic presentation, and so forth). In certain embodiments, a service platform may receive one or more user input events that may be interpreted and processed as a user intent to provide a contextual presentation on one or more of the ecosystem of network-connected devices each associated with a particular user. The service platform may then determine a fulfillment goal based on the user content. For example, in some embodiments, based on the received user input event, the service platform may determine a fulfillment goal (e.g., plan a vacation, build a personal budget, generate a workplace itinerary, search for a purchasable product, search for one or more television programs, request directions to a particular location, make reservations to a local restaurant, schedule vehicle maintenance, and so forth) that corresponds to the received user input event. In some embodiments, in conjunction with determining the fulfillment goal, the service platform may also determine a number of corresponding fulfillment actions to be performed in completing the fulfillment goal, and, further, a fulfillment action path including a sequence by which the number of fulfillment actions is to be performed.

In certain embodiments, the service platform may then generate a multi-fragment application package including respective fragments based on respective device types of the ecosystem of network-connected devices. For example, in some embodiments, the multi-fragment data package may include an adaptable presentation layer that includes instructions for presenting respective fragments, which may respectively correspond to the fulfillment actions, on the ecosystem of different network-connected devices in accordance with the fulfillment goal to complete the fulfillment goal. Particularly, in certain embodiments, the multi-fragment application package may include an adaptable presentation layer that may be utilized to provide contextual presentations (e.g., a television (TV) may present through display or sound content associated with a particular television program in accordance with the fulfillment goal, a fridge may present through display or sound content associated with grocery items in accordance with the fulfillment goal, an exercise tracker may present through display or sound content associated with a particular physical activity to be performed by the user at a particular time in accordance with the fulfillment goal, a voice-controlled personal assistant device may present through audible content a reminder or a response to a request in accordance with the fulfillment goal, a vehicle may present through display or sound content associated with a present fuel range or a charge range of the vehicle and/or navigational directions to a particular destination, and so forth) to respective application layers of the ecosystem of different network-connected devices associated with a particular user.

In certain embodiments, the service platform may then provide the respective fragments of the multi-fragment application package to the ecosystem of different network-connected devices. For example, the service platform may provide respective fulfillment actions to one or more of the different network-connected devices for contextual presentation in accordance with the fulfillment goal, such that once the one or more of the different network-connected devices implicated by the fulfillment goal performs the respective fulfillment actions by sequence of the fulfillment path, the fulfillment goal will have been completed. Accordingly, the present embodiments may provide an adaptable and fragmented presentation layer to be provided to respective network-connected devices for contextual presentation of user content in various formats (e.g., visual presentation, voice presentation, audible presentation, haptic presentation, and so forth). In this way, the intended user content may be contextually presented across an ecosystem of different network-connected devices in accordance with a particular fulfillment goal by adapting the respective fragments to the appropriate device capability, device configuration, device platform, device user interaction mediums, device presentation mediums, and so forth. This may thus allow the presentation layer in various applications to be more firmly controlled on the server-side, such that contextual presentation of intended user content on the side of the ecosystem of different network-connected devices may be more predictable, consistent, and adaptable over time. As used herein, "user content" may refer to any data or content (e.g., images, video, text, audio, speech, and so forth) that may be associated with one or more particular users and/or one or more particular devices or applications that are utilized by the one or more particular users. Furthermore, as used herein, "intended user content" may refer to any data (e.g., images, video, text, audio, speech, web pages, bots, broadcasts, posts, and so forth), metadata (e.g., timestamps, identifications, tags, and so forth), content, signal, display (e.g., lighting display, blinking display), or effect (e.g., haptic effects) that a particular user may desire or intend to be contextually presented on one or all network-connected devices (e.g., devices connected to a cloud computing based network or fog computing based network) that may be associated with the particular user, for example, in response to one or more detected user-initiated events (e.g., click, touch, face capture, eye gaze, gesture, biometric input, motional input, and so forth).

Figure 1:
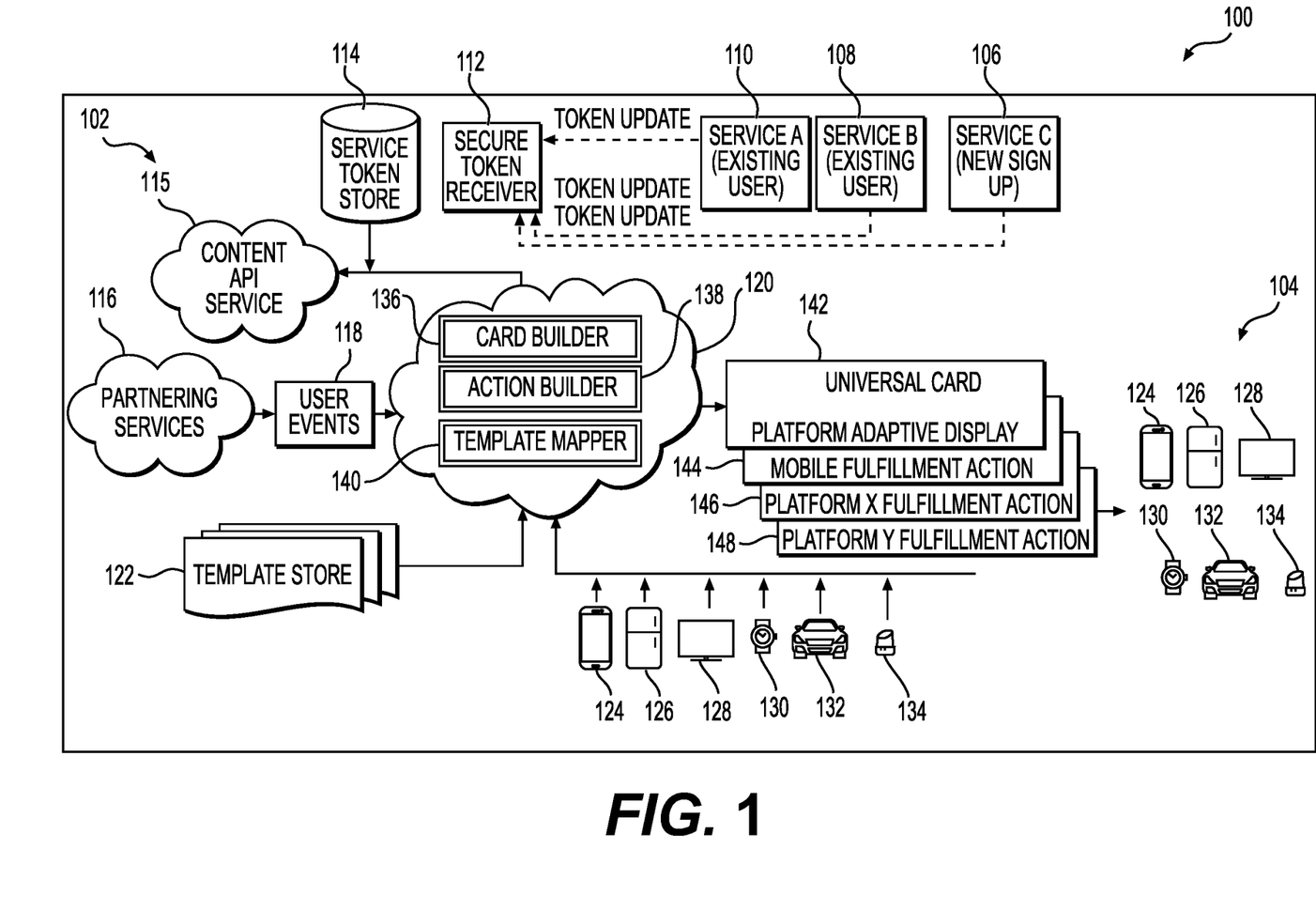
FIG. 1 illustrates an example cloud-based device ecosystem.

FIG. 1 illustrates an example cloud-based device ecosystem 100. The cloud-based device ecosystem 100 may include a cloud computing service 102 and an ecosystem of different network-connected devices 104. In certain embodiments, the cloud computing service 102 may maintain one or more user accounts and may be utilized to service the ecosystem of different network-connected devices 104 each associated with, for example, a single user and single user account maintained by the cloud computing service 102. For example, in one embodiment, the cloud computing service 102 may include a Platform as a Service (PaaS) architecture, a Software as a Service (SaaS) architecture, and an Infrastructure as a Service (IaaS), or other various cloud-based cluster computing architecture. As further illustrated, user account tokens 106 (e.g., new user sign-up data), 108 (e.g., existing user account), and 110 (e.g., existing user account) may be provided to a secure token receiver 112 that may be utilized, for example, to sign-up new users and/or to authenticate existing users of the cloud computing service 102. The user account information may be stored to one more databases 114 to be later accessed (e.g., "called") when, for example, a user attempts to access her account via a content API service 115.

In certain embodiments, as further depicted by FIG. 1, a particular user, for example, may interface with the cloud computing service 102 via one or more partnering services 116. For example, the one or more partnering services 116 may include an application software (e.g., desktop application, mobile app) that the user may access on, for example, one of the ecosystem of different network-connected devices 104 that may be associated with the particular user. In certain embodiments, as the particular user interacts with the one or more partnering services 116, user event inputs 118 may be provided to a service platform 120. For example, in some embodiments, the user event inputs 118 may include, for example, one or more user click inputs, one or more user touch inputs, one or more user gesture inputs, one or more user voice inputs, one or more user eye gazes, a user face capture, a user time trigger, one or more user motional inputs (e.g., handwave, head turn), one or more user biometric inputs (e.g., fingerprint, heartrate, pulse, iris scan), one or more user physical activity inputs (e.g., exercise input), and so forth, that may be processed by the service platform 120.

In certain embodiments, based on the user event inputs 118, the service platform 120 may derive a fulfillment goal and user intent to provide a contextual presentation on the ecosystem of different network-connected devices 124, 126, 128, 130, 132, and 134 in accordance with the fulfillment goal. In some embodiments, the ecosystem of different network-connected devices 124, 126, 128, 130, 132, and 134 may include, for example, one or more TVs, desktop computers, tablet computers, mobile phone electronic devices, home appliances (e.g., refrigerator, washer, dryer, stove, microwave, vacuum cleaner, oven, dishwasher, and so forth), vehicles (e.g., cars, trucks, bicycles, scooters, and so forth), voice-controlled personal assistant electronic devices, wearable electronic devices (e.g., watch, exercise tracker, wristband, waistband, heartrate monitor, head mounted display (HMD), and so forth), loudspeaker electronic devices, headphone electronic devices, earbud electronic devices, or one or more cameras that may be each associated with the particular user. For example, in one embodiment, the ecosystem of different network-connected devices 124, 126, 128, 130, 132, and 134 may include a multi-device experience ecosystem, in which a collection of IoT devices, each associated with a particular identified user account, may be each wirelessly connected to each other for the purposes of sharing and exchanging user data between each of the collection of IoT devices. In some embodiments, once the service platform 120 derives the user intent, the service platform 120 may access a device template store 122, which may include device specific information corresponding to each of the ecosystem of different network-connected devices 124, 126, 128, 130, 132, and 134.

In certain embodiments, as further depicted by FIG. 1, the service platform 120, which may include one or more compute engines 136 (e.g., "Card Builder"), 138 ("Action Builder"), and 140 (e.g., "Template Mapper"), may generate a multi-fragment application package 142 (e.g., "Universal Card"). In certain embodiments, the multi-fragment application package 142 (e.g., "Universal Card") may include a number of application fragments or fulfillment actions 144 (e.g., "Mobile Fulfillment Action"), 146 (e.g., "Platform X Fulfillment Action"), and 148 (e.g., "Platform Y Fulfillment Action") respectively corresponding to only those of the ecosystem of different network-connected devices 124, 126, 128, 130, 132, and 134 that may be implicated in completing the determined fulfillment goal. For example, in one embodiment, a determine fulfillment goal may correspond to a user intent to, for example, set a reminder to exercise this weekend. In such a case, the service platform 120 may determine a fulfillment goal that includes fulfillment actions 144, 146, and 148 that includes a reminder notification that may be presented on each of the network-connected device 124 (e.g., mobile phone) and the network-connected device 130 (e.g., wearable electronic device), a notification that may be presented on the network-connected device 128 (e.g., TV) indicating, for example, that a TV program scheduled to air during the same time as the user's exercise will be recorded, and a notification that may be presented on the network-connected device 130 (e.g., fridge) indicating, for example, that a protein shake or other nutritional drink has been added to this week's grocery list.

In certain embodiments, the service platform 120 may also determine a fulfillment action path, which may include a sequence by which the number of fulfillment actions 144, 146, and 148 is to be performed. For example, continuing the forgoing example, the service platform 120 may determine a fulfillment action path that includes presenting the notification on the network-connected device 130 (e.g., fridge) first, presenting the notification on the network-connected device 128 (e.g., TV) next, and presenting the reminder notifications concurrently on the network-connected device 124 (e.g., mobile phone) and the network-connected device 130 (e.g., wearable electronic device), for example, a day before the date of which the particular user is to exercise.

In some embodiments, while the service platform 120 may also keep track of a transition state (e.g., a status of each of the fulfillment actions 144, 146, and 148 and whether the user makes a change with respect to one or more of the fulfillment actions 144, 146, and 148 that should be reflected in the fulfillment goal before it is completed) associated with the number of fulfillment actions 144, 146, and 148 as the fulfillment goal is being performed by the network-connected device 130 (e.g., fridge), the network-connected device 128 (e.g., TV), the network-connected device 124 (e.g., mobile phone), and the network-connected device 130 (e.g., wearable electronic device). For example, in one embodiment, in which a single fulfillment action is to be completed on multiple network-connected devices, such as a reminder notification, the service platform 102 may determine and track fulfillment action transition states as the single fulfillment action is cycled through the multiple network-connected devices until completion.

Figure 2:
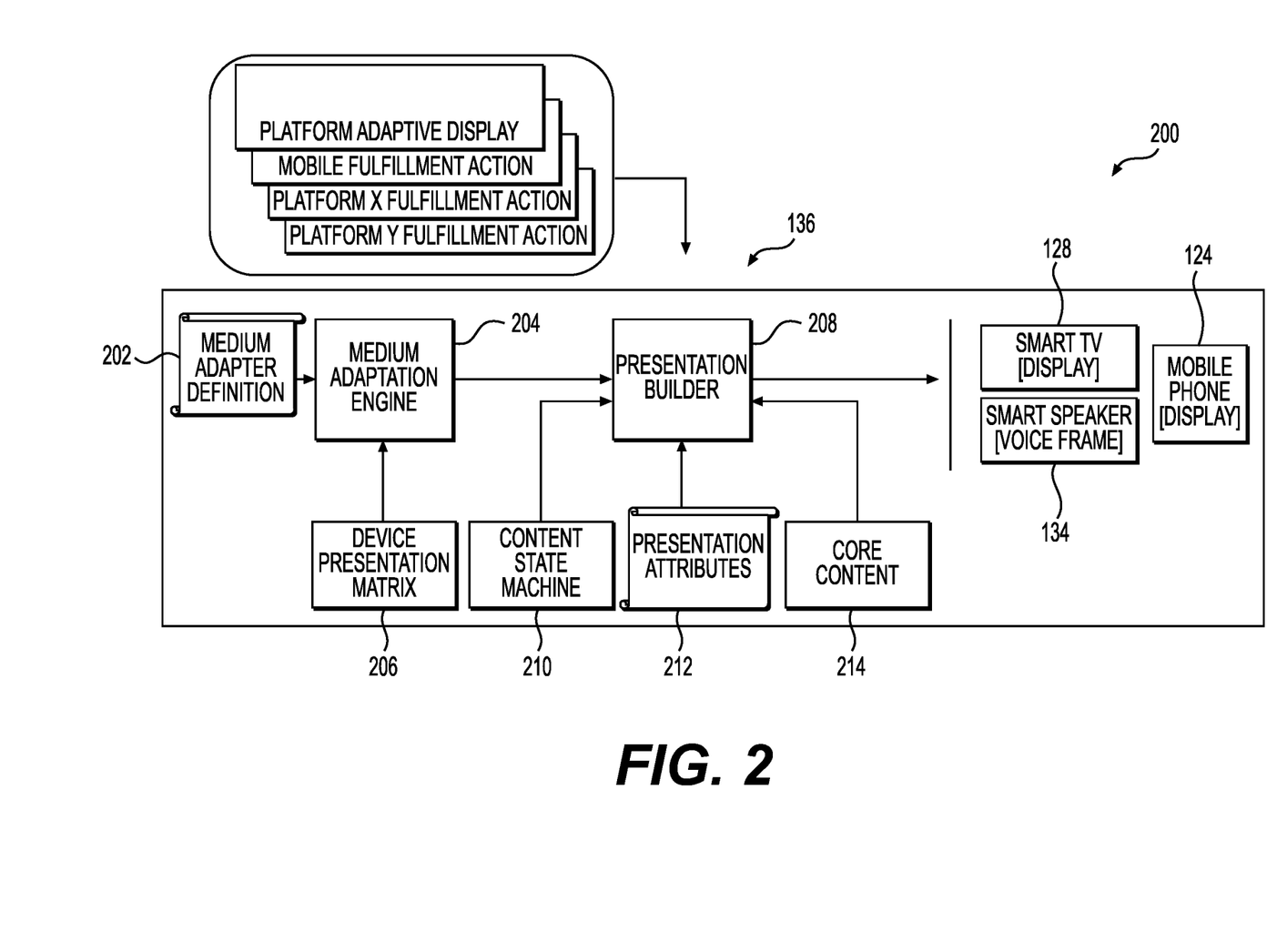
FIG. 2 illustrates a detailed embodiment of an adaptable presentation layer compute engine of a service platform.

FIG. 2 illustrates a detailed embodiment 200 of an adaptable presentation layer compute engine of a service platform 120. As illustrated by FIG. 2, the compute engine 136 (e.g., "Card Builder") may include medium adapter definition 202 that may be utilized by a medium adaptation engine 204 to select and adapt the presentation layer to a particular one or more of those of the ecosystem of different network-connected devices 124, 126, 128, 130, 132, and 134 implicated by, for example, the determined fulfillment goal. The medium adaptation engine 204 may also receive an input from a device presentation matrix 206 to further adapt the presentation layer to the particular one or more of the ecosystem of different network-connected devices 124, 126, 128, 130, 132, and 134. The device presentation matrix 206 may include device specific presentation data including, for example, display type, size, and resolution, voice data format, audio data format, haptic effect capabilities, and so forth.

In certain embodiments, the medium adaptation engine 204 may then provide an output to a presentation builder 208. The presentation builder 208 may receive a content state machine 210 input (e.g., indicating fulfillment action transition state), a presentation attributes 212 input (e.g., indicating display graphics and widgets, natural language understanding (NLU) functionality, automatic speech recognition (ASR) functionality, and so forth), and a core content 214 input (e.g., indicating the actual user content to be presented in accordance with the fulfillment goal). The presentation builder 208 may then generate the adapted presentation layer by, for example, qualifying the core content 214 with the presentation attributes 212. The presentation builder 208 may then provide an output of the particular one or more of those of the ecosystem of different network-connected devices 124, 126, 128, 130, 132, and 134 implicated, for example, by the determined fulfillment goal.

Figure 3:
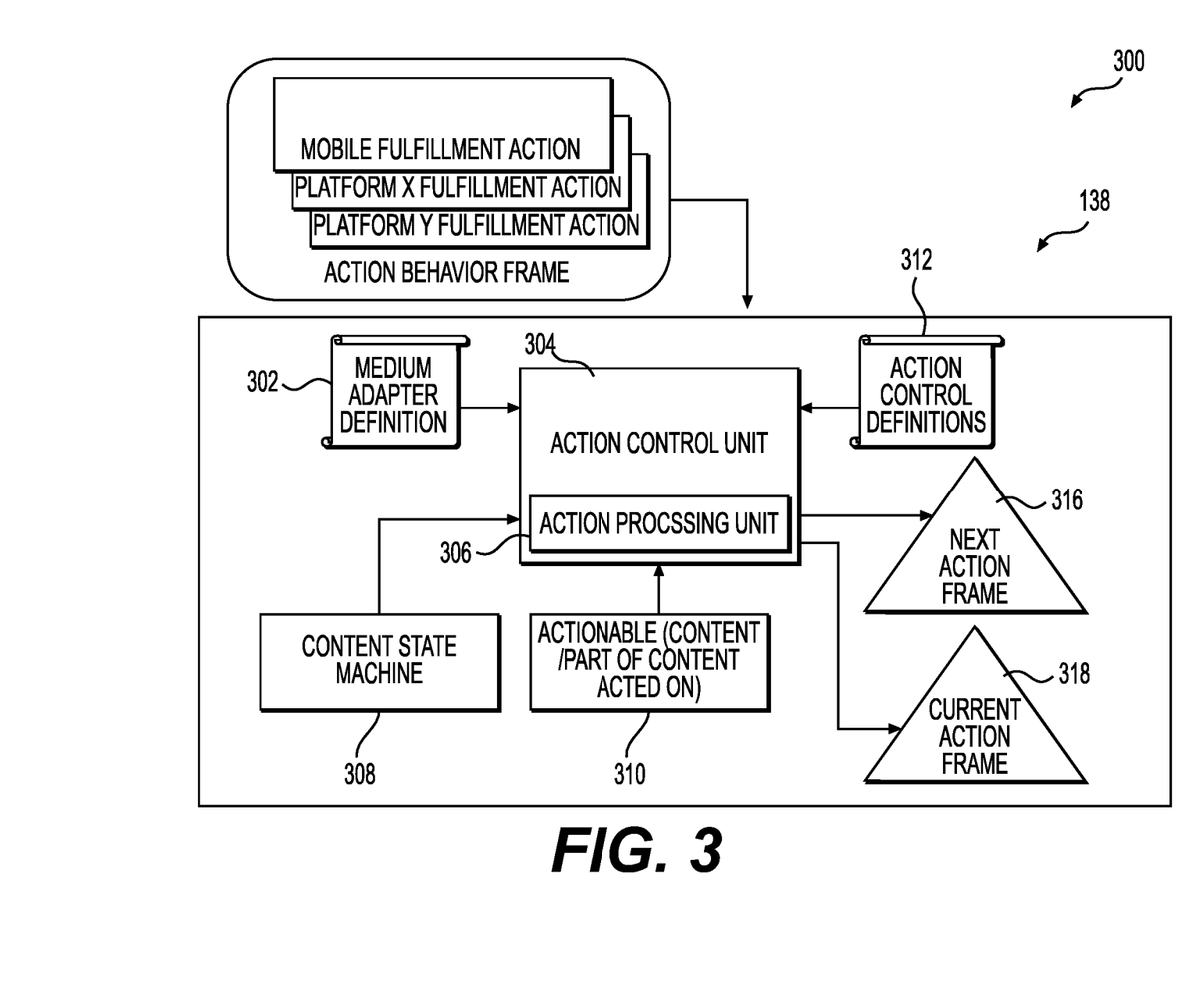
FIG. 3 illustrates a detailed embodiment of a fulfillment action compute engine of the service platform.

FIG. 3 illustrates a detailed embodiment 300 of a fulfillment action compute engine 138 (e.g., "Action Builder") of the service platform 120. As illustrated by FIG. 3, the compute engine 138 may include medium adapter definition 302 that may be utilized by a fulfillment action control unit 304 and dedicated action processing unit 306 to determine one or more fulfillment action paths for performing the determined fulfillment goal. Specifically, in certain embodiments, the fulfillment action control unit 304 may be utilized to determine, learn, define, and predict the behavior and preferences of the particular user and generate various fulfillment action paths (e.g., most optimal fulfillment action path, shortest fulfillment action path, most user-preferred fulfillment action path, and so forth) in accordance with the behavior and preferences of the particular user learned and adapted thereto over time.

As further depicted by FIG. 3, the fulfillment action control unit 306 may also receive a content state machine 308 input (e.g., indicating fulfillment action transition state) and an actionable component input 310, which may indicate the particular user content and/or partial user content of the fulfillment actions 144, 146, and 148 to be processed and/or sequenced by the fulfillment action control unit 304 and dedicated action processing unit 306. In certain embodiments, the fulfillment action control unit 304 and dedicated action processing unit 306 may determine the transition state as each fulfillment action 144, 146, and 148 is performed before causing a subsequent fulfillment action in the fulfillment action path to be performed. As further illustrated, the fulfillment action control unit 306 may also receive fulfillment action control definitions 312 (e.g., fulfillment action rule). Based on the medium adapter definition 302, the content state machine 308 input, the actionable component input 310, and the action control definitions 312, the fulfillment action control unit 304 and dedicated action processing unit 306 may then provide an output of a current fulfillment action frame 316 to be performed and queue a next fulfillment action frame 318 to be performed at the completion of the current fulfillment action frame 316. Particularly, the fulfillment actions 144, 146, and 148 as discussed above with respect to FIG. 1 may correspond to the action frames 316 and 318.

Figures 4A, 4B:
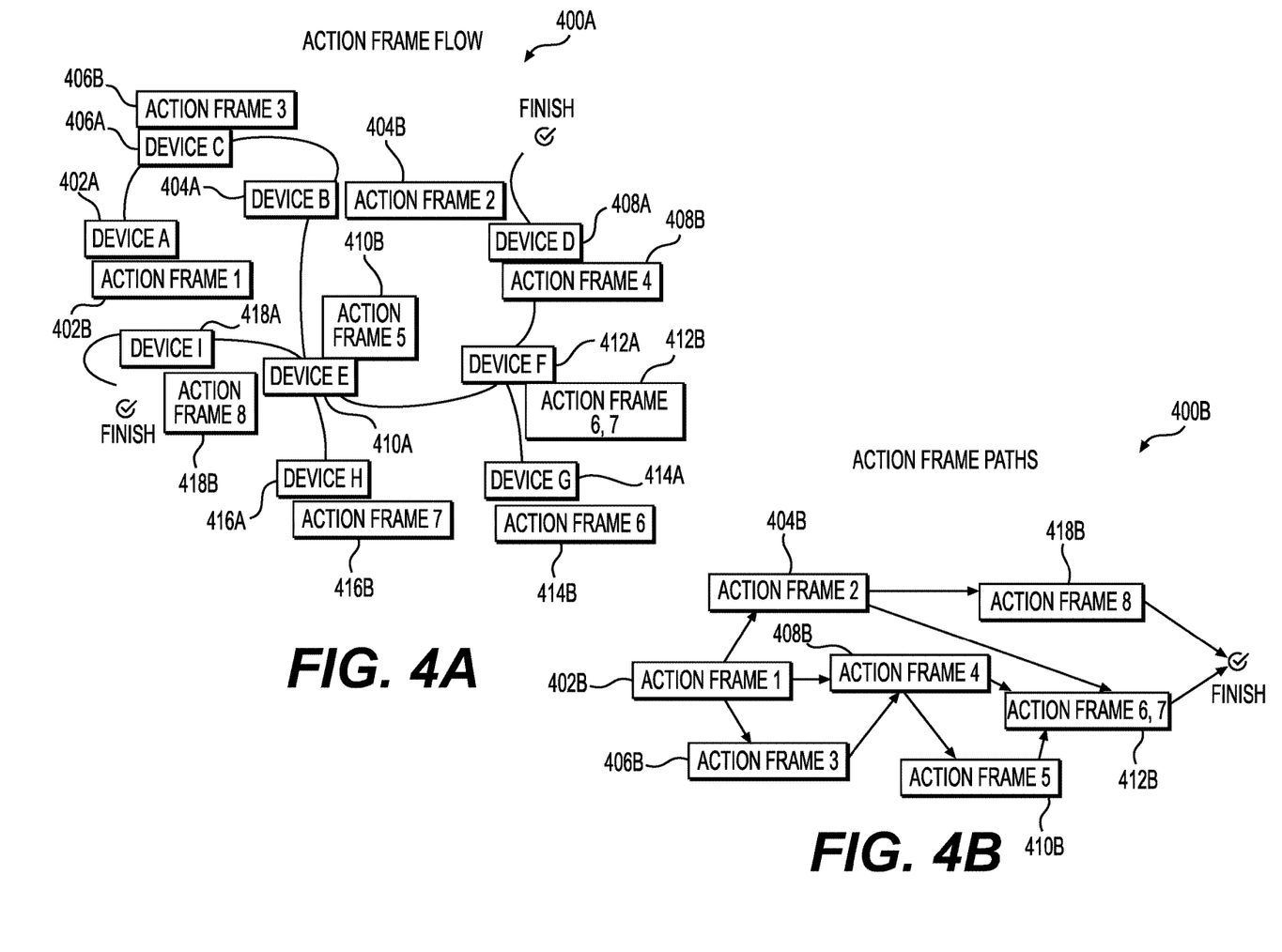
FIGS. 4A and 4B illustrate an example fulfillment action frame flow and a fulfillment action frame path, respectively.

FIGS. 4A and 4B illustrate an example fulfillment action frame flow 400A and a fulfillment action frame path 400B, respectively. Specifically, FIG. 4A illustrates a number of possible fulfillment action paths 400A that may be established by way of nodes connecting the ecosystem of different network-connected devices to a completion of one or more fulfillment goals (e.g., "Finish"). For example, the performance of the fulfillment action frames 402A (e.g., "Action Frame 1"), 404A (e.g., "Action Frame 2"), 406A (e.g., "Action Frame 3"), 408A (e.g., "Action Frame 4"), 410A (e.g., "Action Frame 5"), 412A (e.g., "Action Frames 6, 7"), 414A (e.g., "Action Frame 6"), 416A (e.g., "Action Frame 7"), and 418A (e.g., "Action Frame 8") by way of the ecosystem of different network-connected devices 402B (e.g., "Device A"), 404B (e.g., "Device B"), 406B (e.g., "Device C"), 408B (e.g., "Device D"), 410B (e.g., "Device E"), 412B (e.g., "Device F"), 414B (e.g., "Device G"), 416B (e.g., "Device H"), and 418B (e.g., "Device I") may be accomplished as sequential flows between any of the connecting nodes establishing particular fulfillment action paths between the ecosystem of different network-connected devices 402B-418B. FIG. 400B illustrates one such fulfillment action path 400B that may be derived from the number of possible fulfillment action paths 400A and determined by, for example, the behavior and preferences of a particular user (e.g., the fulfillment action path 400B may include a most optimal fulfillment action path, a shortest fulfillment action path, a most user-preferred fulfillment action path, and so forth).

Figure 5:
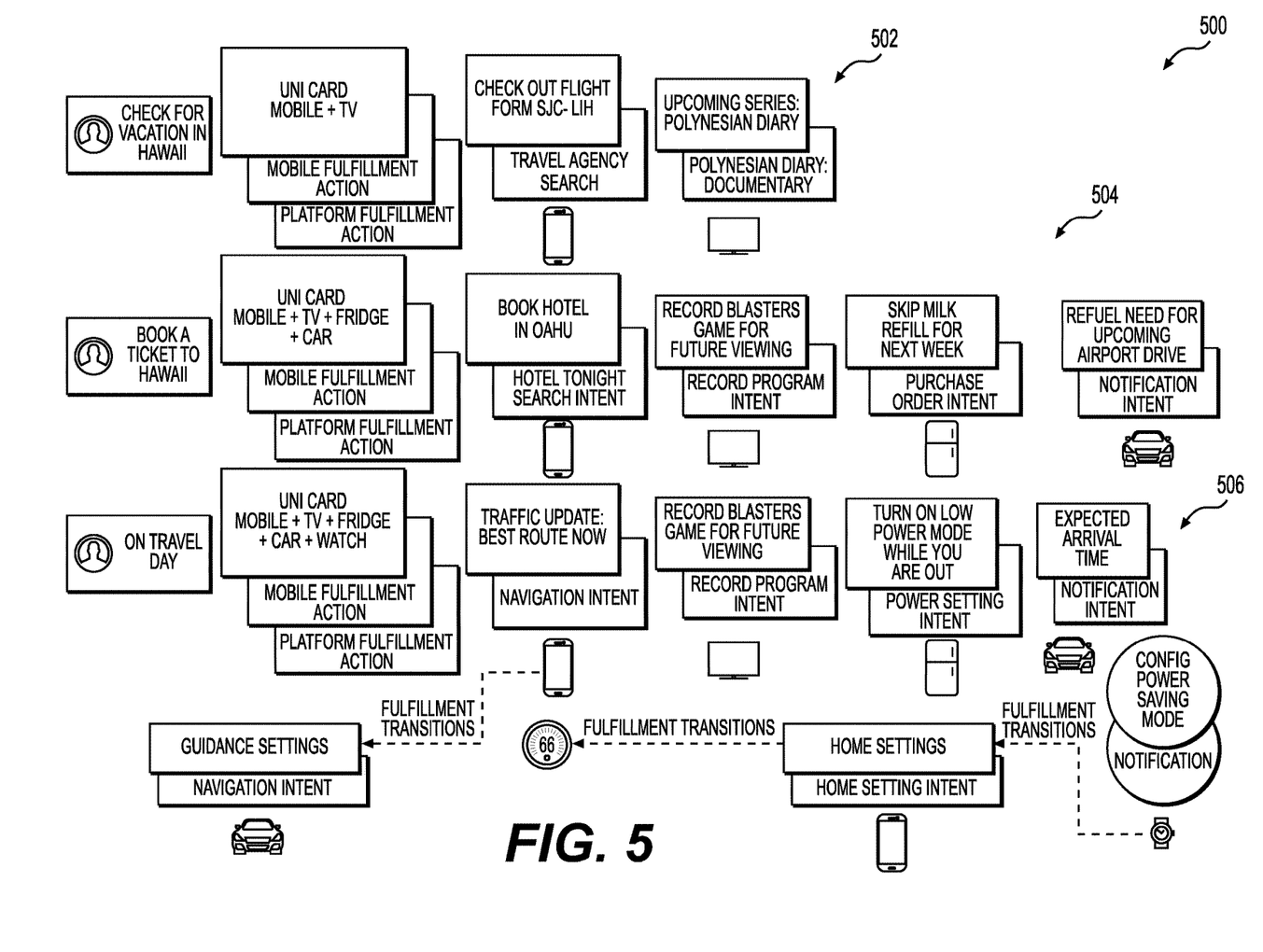
FIG. 5 illustrates a diagram flow of exemplary use cases.

FIG. 5 depicts a diagram 500 of exemplary use cases 502, 504, and 506. FIG. 5 illustrates techniques for generating an adaptable and fragmented presentation layer to be provided to an ecosystem of different network-connected devices for contextual presentation in various formats, in accordance with the presently disclosed embodiments. For example, the exemplary use case 502 may include a user intent to, for example, check for a vacation to Hawaii. As further illustrated, a fulfillment goal corresponding to the user's intent to check for a vacation to Hawaii may be determined, and the associated fulfillment actions to complete the fulfillment goal may be determined to include presenting a travel agency website on a mobile phone device of the user for the user to select a flight and presenting a notification of a related television program (e.g., Polynesian documentary) on a TV of the user.

Similarly, the exemplary use case 504 may include a user intent to, for example, book a flight ticket to Hawaii. As further illustrated, a fulfillment goal corresponding to the user's intent to book a flight ticket to Hawaii may be determined, and the associated fulfillment actions to complete the fulfillment goal may be determined to include presenting a travel agency website on a mobile phone device of the user for selecting appropriate lodging (e.g., hotel), presenting a notification on the TV of the user, in which the user may be prompted to record a television program the user typically watches while the user is away on vacation to Hawaii. As further depicted, fulfillment actions may also include presenting an updated grocery list on the fridge of the user, in which the updated grocery list may identify one or more perishable food items (e.g., dairy products) that the user should skip purchasing in view of the upcoming vacation to Hawaii. Lastly, a fulfillment action may include presenting a reminder notification inside the vehicle of the user, in which the user may be reminded to refuel or recharge the vehicle prior to, for example, the date and time of the user's flight.

In another embodiment, the exemplary use case 506 may include a user intent, for example, that corresponds to the day on which the user intends to travel (e.g., continuing from the example of the vacation to Hawaii as discussed above). As further illustrated, a fulfillment goal corresponding to the user's intent may be determined, and the associated fulfillment actions to complete the fulfillment goal may be determined to include presenting a navigational map (e.g., navigational directions) on the mobile phone device and inside the vehicle of the user. Another fulfillment action for presenting a notification on the TV of the user, in which the user may be prompted to record a television program the user typically watches while the user is away on vacation to Hawaii. A fulfillment action may also include presenting a notification on the fridge of the user, instructing the user to set the fridge or other home appliance to a lower-power mode. A fulfillment action may include presenting an expected arrival time inside the vehicle of the user once the user commences departing, for example, from home to the airport. A last fulfillment action for completing the fulfillment goal may include presenting a notification on the wearable electronic device and mobile phone device, including a prompting the user to select whether or not to set one or more home devices (e.g., thermostat) to operate in a low-power mode while the user is away on vacation to Hawaii.

Figure 6:
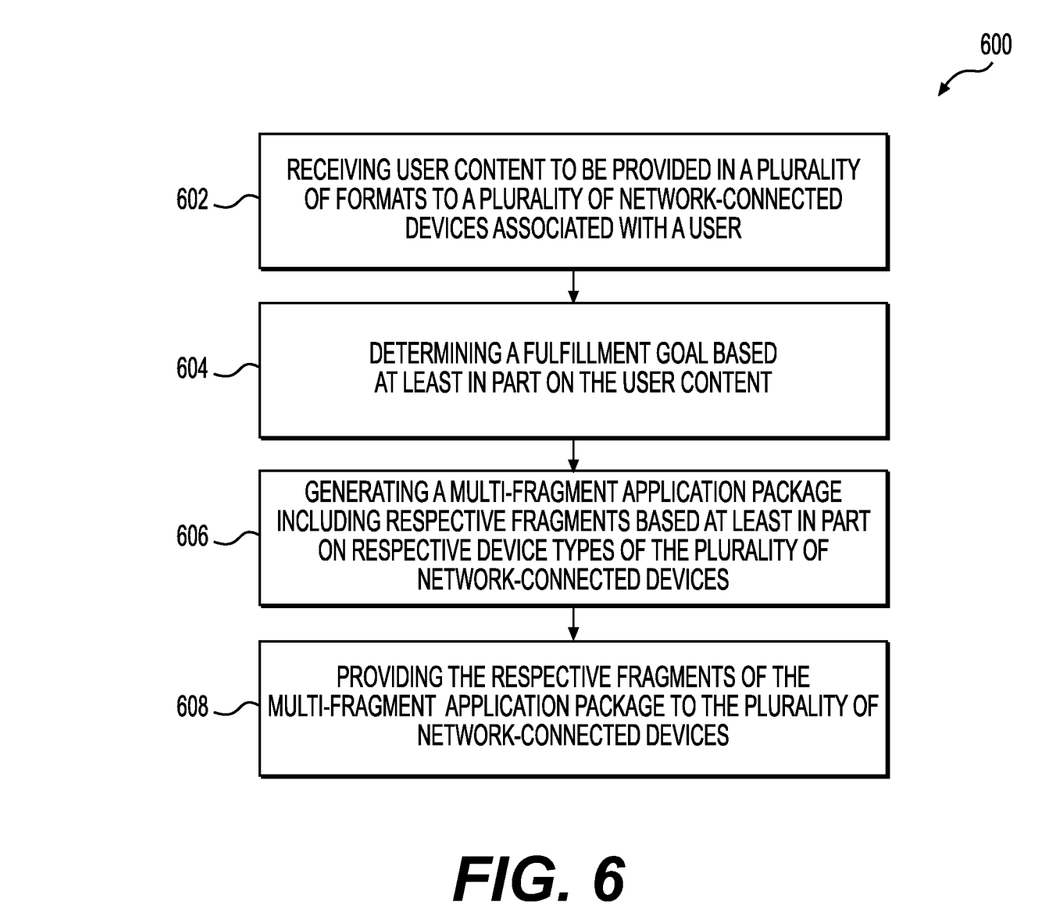
FIG. 6 illustrates is a flow diagram of a method for generating an adaptable and fragmented presentation layer to be provided to an ecosystem of network-connected devices for contextual presentation of user content in various formats.

FIG. 6 illustrates is a flow diagram of a method 600 for generating an adaptable and fragmented presentation layer to be provided to an ecosystem of network-connected devices for contextual presentation of user content in various formats (e.g., visual presentation, voice presentation, audible presentation, haptic presentation, and so forth). The method 600 may be performed utilizing one or more processing devices (e.g., service platform 120) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or some combination thereof.

The method 600 may begin block 602 with the one or more processing devices (e.g., service platform 120) determining user content to be provided in a plurality of formats to a plurality of network-connected devices associated with a user. For example, in certain embodiments, the service platform 120 may receive one or more user input events (e.g., a user click input, a user touch input, a user gesture input, a user voice input, a user eye gaze, a user face capture, a user time trigger, a user motional input, a user physical activity input, a user face capture, and so forth) that may be interpreted and processed as a user intent to provide a contextual presentation on one or more of the network-connected devices 124, 126, 128, 130, 132, and 134 (e.g., an ecosystem of network-connected devices including one or more TVs, desktop computers, tablet computers, mobile phone electronic devices, home appliances, vehicles, voice-controlled personal assistant electronic devices, wearable electronic devices, loudspeaker electronic devices, headphone electronic devices, earbud electronic devices, cameras, and so forth) each associated with a particular user.

The method 600 may then continue at block 604 with the one or more processing devices (e.g., service platform 120) determining a fulfillment goal based at least in part on the user content. For example, in some embodiments, based on the received user input event, the service platform 120 may determine a fulfillment goal (e.g., plan a vacation, build a personal budget, generate a workplace itinerary, search for a purchasable product, search for one or more television programs, request directions to a particular location, make reservations to a local restaurant, schedule vehicle maintenance, and so forth) corresponding to the received user input event. The method 600 may then continue at block 606 with the one or more processing devices (e.g., service platform 120) generating a multi-fragment application package including respective fragments based at least in part on respective device types of the plurality network-connected devices. For example, as previous discussed above, the service platform 120 may generate a multi-fragment application package 142 (e.g., "Universal Card"), which may include a number of application fragments (e.g., fulfillment actions 144, 146, and 148) respectively corresponding to each network-connected devices 124, 126, 128, 130, 132, and 134 that may be implicated in completing the determined fulfillment goal.

Specifically, in certain embodiments, the multi-fragment application package 142 may include an adaptable presentation layer that may be utilized to provide contextual presentations (e.g., a TV may present through display or sound content associated with a particular television program in accordance with the fulfillment goal, a fridge may present through display or sound content associated with grocery items in accordance with the fulfillment goal, an exercise tracker may present through display or sound content associated with a particular physical activity to be performed by the user at a particular time in accordance with the fulfillment goal, a voice-controlled personal assistant device may present through audible content a reminder or a response to a request in accordance with the fulfillment goal, a vehicle may present through display or sound content associated with a present fuel range or a charge range of the vehicle and/or navigational directions to a particular destination, and so forth) to respective application layers of the network-connected devices 124, 126, 128, 130, 132, and 134 associated with the particular user.

The method 600 may then conclude at block 606 with the one or more processing devices (e.g., service platform 120) providing the respective fragments of the multi-fragment application package to the plurality of network-connected devices. For example, the service platform 120 may provide the respective fulfillment actions 144, 146, and 148 to the network-connected devices 124, 126, 128, 130, 132, and 134 associated with the particular user for contextual presentation in accordance to the fulfillment goal, such that once the respective network-connected devices 124, 126, 128, 130, 132, and 134 implicated by the fulfillment goal performs the respective fulfillment actions 144, 146, and 148, the fulfillment goal will have been completed.

Accordingly, the present embodiments may provide an adaptable and fragmented presentation layer to be provided to an ecosystem of different network-connected devices for contextual presentation of user content in various formats (e.g., visual presentation, voice presentation, audible presentation, haptic presentation, and so forth). In this way, the intended user content may be contextually presented across different network-connected devices of an ecosystem of network-connected devices in accordance with a particular fulfillment goal by adapting the respective fragments to the appropriate device capability, device configuration, device platform, device user interaction mediums, device presentation mediums, and so forth. This may thus allow the presentation layer in various applications to be more firmly controlled on the server-side, such that contextual presentation of intended user content on the side of the ecosystem of different network-connected devices may be more predictable, consistent, and adaptable over time.

Figure 7:
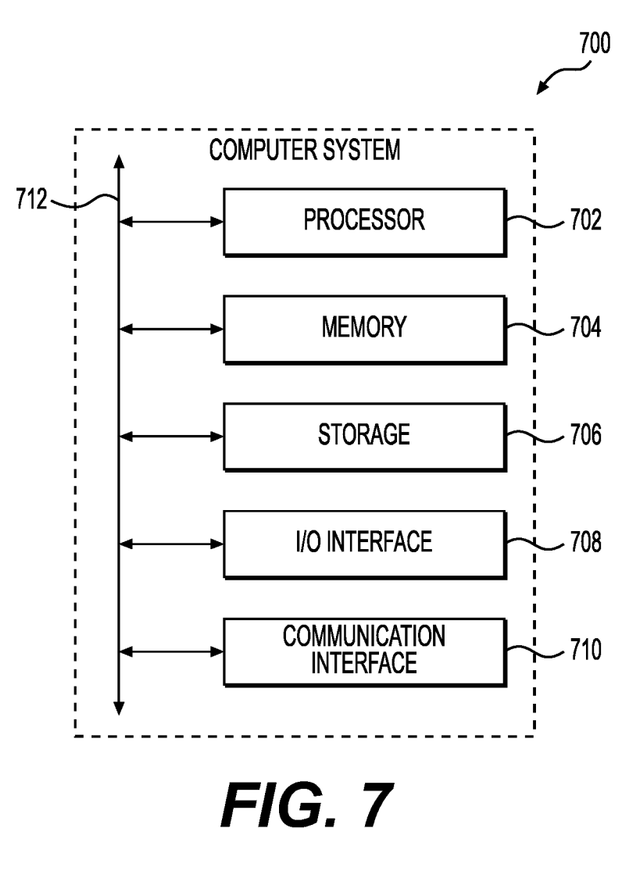
FIG. 7 illustrates an example computer system.

FIG. 7 illustrates an example computer system 700 that may be utilized for generating an adaptable and fragmented presentation layer to be provided to an ecosystem of network-connected devices for contextual presentation of user content in various formats (e.g., visual presentation, voice presentation, audible presentation, haptic presentation, and so forth). In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks.

Where appropriate, one or more computer systems 700 may perform without substantial spatial or temporal limitation one or more steps of one or more methods described or illustrated herein. As an example, and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702.

Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example, and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere).

One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 706 for them. Where appropriate, I/O interface 708 may include one or more device or software drivers enabling processor 702 to drive one or more of these I/O devices. I/O interface 708 may include one or more I/O interfaces 706, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it.

As an example, and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example, and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   determining user content to be provided in a plurality of formats to a plurality of network-connected devices associated with a user, wherein the plurality of network-connected devices are of a plurality of device types;
   determining a fulfillment goal based at least in part on the user content;
   generating a multi-fragment application package based at least in part on the respective device types of the plurality of network-connected devices, wherein the multi-fragment data package comprises an adaptable presentation layer that includes instructions for presenting respective fragments of the multi-fragment application package on the plurality of network-connected devices in accordance with the fulfillment goal; and
   providing the respective fragments of the multi-fragment application package to the plurality of network-connected devices.

2. The method of claim 1, wherein determining the fulfillment goal comprises determining a plurality of fulfillment actions to be performed in completing the fulfillment goal, wherein the plurality of fulfillment actions corresponds to the respective fragments.

3. The method of claim 2, wherein determining the fulfillment goal comprises determining a fulfillment action path, wherein the fulfillment action path includes a sequence by which the plurality of fulfillment actions is to be performed.

4. The method of claim 3, further comprising determining a transition state as each fulfillment action is performed before causing a subsequent fulfillment action in the fulfillment action path to be performed.

5. The method of claim 3, wherein determining the fulfillment action path comprises determining the fulfillment action path based at least in part on a determined behavior of the user.

6. The method of claim 1, wherein each of the respective device types comprises a respective device capability, a respective device configuration, a respective one or more device user interaction mediums, or a respective one or more device presentation mediums.

7. The method of claim 1, further comprising:
   prior to generating the multi-fragment application package, receiving respective display templates corresponding to each of the plurality of device types; and
   generating the multi-fragment application package based at least in part on the respective device types and the respective display templates.

8. A system comprising: one or more non-transitory computer-readable storage media including instructions; and one or more processors coupled to the storage media, the one or more processors configured to execute the instructions to:

determine user content to be provided in a plurality of formats to a plurality of network-connected devices associated with a user, wherein the plurality of network-connected devices are of a plurality of device types;

determine a fulfillment goal based at least in part on the user content;

generate a multi-fragment application package based at least in part on the respective device types of the plurality of network-connected devices, wherein the multi-fragment data package comprises an adaptable presentation layer that includes instructions for presenting respective fragments of the multi-fragment application package on the plurality of network-connected devices in accordance with the fulfillment goal; and provide the respective fragments of the multi-fragment application package to the plurality of network-connected devices.

9. The system of claim 8, wherein the one or more processors are further configured to execute the instructions to determine a plurality of fulfillment actions to be performed in completing the fulfillment goal, wherein the plurality of fulfillment actions corresponds to the respective fragments.

10. The system of claim 9, wherein the one or more processors are further configured to execute the instructions to determine a fulfillment action path, wherein the fulfillment action path includes a sequence by which the plurality of fulfillment actions is to be performed.

11. The system of claim 10, wherein the one or more processors are further configured to execute the instructions to determine a transition state as each fulfillment action is performed before causing a subsequent fulfillment action in the fulfillment action path to be performed.

12. The system of claim 10, wherein the one or more processors are further configured to execute the instructions to determine the fulfillment action path based at least in part on a determined behavior of the user.

13. The system of claim 8, wherein each of the respective device types comprises a respective device capability, a respective device configuration, a respective one or more device user interaction mediums, or a respective one or more device presentation mediums.

14. The system of claim 8, wherein the one or more processors are further configured to execute the instructions to:

prior to generating the multi-fragment application package, receive respective display templates corresponding to each of the plurality of device types; and generate the multi-fragment application package based at least in part on the respective device types and the respective display templates.

15. A non-transitory computer-readable medium comprising instructions that, when executed by one or more processors of a computing system, cause the one or more processors to:

determine user content to be provided in a plurality of formats to a plurality of network-connected devices associated with a user, wherein the plurality of network-connected devices are of a plurality of device types;

determine a fulfillment goal based at least in part on the user content;

generate a multi-fragment application package based at least in part on the respective device types of the plurality of network-connected devices, wherein the multi-fragment data package comprises an adaptable presentation layer that includes instructions for presenting respective fragments of the multi-fragment application package on the plurality of network-connected devices in accordance with the fulfillment goal; and provide the respective fragments of the multi-fragment application package to the plurality of network-connected devices.

16. The non-transitory computer-readable medium of claim 15, wherein the instructions further cause the one or more processors to determine a plurality of fulfillment actions to be performed in completing the fulfillment goal, wherein the plurality of fulfillment actions corresponds to the respective fragments.

17. The non-transitory computer-readable medium of claim 16, wherein the instructions further cause the one or more processors to determine a fulfillment action path, wherein the fulfillment action path includes a sequence by which the plurality of fulfillment actions is to be performed.

18. The non-transitory computer-readable medium of claim 17, wherein the instructions further cause the one or more processors to determine a transition state as each fulfillment action is performed before causing a subsequent fulfillment action in the fulfillment action path to be performed.

19. The non-transitory computer-readable medium of claim 15, wherein each of the respective device types comprises a respective device capability, a respective device configuration, a respective one or more device user interaction mediums, or a respective one or more device presentation mediums.

20. The non-transitory computer-readable medium of claim 15, wherein the instructions further cause the one or more processors to:

prior to generating the multi-fragment application package, receive respective display templates corresponding to each of the plurality of device types; and generate the multi-fragment application package based at least in part on the respective device types and the respective display templates.

* * * * *